United States Patent
Bharadwaj, Jr. et al.

(10) Patent No.: US 10,962,637 B2
(45) Date of Patent: Mar. 30, 2021

(54) RADAR DATA PROCESSING USING NEURAL NETWORK CLASSIFIER AND CONFIDENCE METRICS

(71) Applicant: TEXAS INSTRUMENTS INCORPORATED, Dallas, TX (US)

(72) Inventors: Sachin Bharadwaj, Jr., Bengaluru (IN); Sandeep Rao, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 176 days.

(21) Appl. No.: 16/204,457

(22) Filed: Nov. 29, 2018

(65) Prior Publication Data

US 2019/0391251 A1 Dec. 26, 2019

Related U.S. Application Data

(60) Provisional application No. 62/689,446, filed on Jun. 25, 2018.

(51) Int. Cl.
| | | |
|---|---|---|
| *G01S 13/58* | (2006.01) | |
| *G01S 13/34* | (2006.01) | |
| *G01S 7/40* | (2006.01) | |
| *G01S 7/02* | (2006.01) | |

(52) U.S. Cl.
CPC ............ *G01S 13/583* (2013.01); *G01S 7/021* (2013.01); *G01S 7/4056* (2013.01); *G01S 13/343* (2013.01)

(58) Field of Classification Search
CPC combination set(s) only.
See application file for complete search history.

(56) References Cited

U.S. PATENT DOCUMENTS

| 4,945,494 A | 7/1990 | Penz et al. |
|---|---|---|
| 5,499,030 A | 3/1996 | Wicks et al. |
| 9,541,637 B2 | 1/2017 | Searcy et al. |
| (Continued) | | |

FOREIGN PATENT DOCUMENTS

EP 0845686 A2 3/1998

OTHER PUBLICATIONS

Notification of Transmittal of the International Search Report and the Written Opinion of the International Searching Authority, or the Declaration; dated Oct. 17, 2019; 7 pages.

*Primary Examiner* — Mamadou L Diallo
(74) *Attorney, Agent, or Firm* — Ebby Abraham; Charles A. Brill; Frank D. Cimino

(57) ABSTRACT

A radar data processing device includes at least one analog-to-digital converter (ADC) configured to digitize a plurality of input signals, wherein each input signal includes radar chirp and radar chirp reflection information received at one of a plurality of receiver antennas. The radar data processing device also includes Fast Fourier Transform (FFT) logic configured to generate FFT output samples based on each digitized input signal, wherein at least some of the generated FFT output samples are across antenna FFT output samples associated with at least two of the plurality of receiver antennas. The radar data processing device also includes a processor configured to determine a plurality of object parameters based on at least some of the generated FFT output samples, wherein the processor uses a neural network classifier trained to provide a confidence metric for at least one of the plurality of object parameters.

24 Claims, 10 Drawing Sheets

(56) References Cited

U.S. PATENT DOCUMENTS

| | | | |
|---|---|---|---|
| 2007/0156317 A1* | 7/2007 | Breed | B60R 21/01516 |
| | | | 701/45 |
| 2007/0205937 A1* | 9/2007 | Thompson | G01S 13/89 |
| | | | 342/22 |
| 2008/0294315 A1* | 11/2008 | Breed | E05F 15/431 |
| | | | 701/49 |
| 2019/0011534 A1* | 1/2019 | Trotta | G01S 13/878 |
| 2019/0041494 A1* | 2/2019 | Roger | G01S 7/352 |
| 2019/0120932 A1* | 4/2019 | Smith | G01S 7/2955 |
| 2019/0195985 A1* | 6/2019 | Lin | G01S 7/36 |
| 2019/0242974 A1* | 8/2019 | Tai | G06K 9/6215 |
| 2019/0285725 A1* | 9/2019 | Roger | G01S 7/032 |
| 2019/0317191 A1* | 10/2019 | Santra | G01S 7/295 |
| 2019/0339360 A1* | 11/2019 | Ygnace | G01S 7/354 |

\* cited by examiner

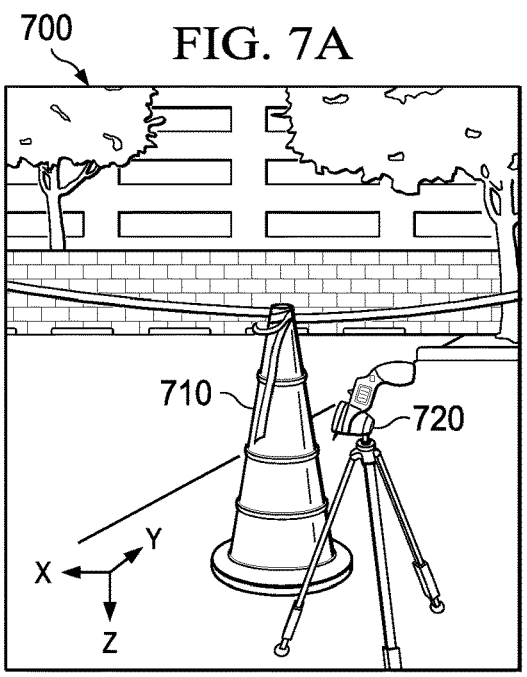
FIG. 7A
FIG. 7C
| | X (m) | Y (m) | Z (m) |
|---|---|---|---|
| RANGE INDEX | 0.45 | 0.3 | UNK |
| 12 | 0.35562 | 0.20817 | -0.23791 |
| 13 | 0.37659 | 0.22709 | -0.27576 |
| 14 | 0.39412 | 0.1933 | -0.35145 |
| 16 | 0.44423 | 0.40552 | -0.24331 |
| 17 | 0.40462 | -0.1514 | -0.5407 |
| 20 | 0.33879 | -0.38525 | -0.64208 |
| 22 | 0.73915 | -0.31225 | -0.4258 |
| 28 | 0.59971 | 0.83944 | -0.54746 |
| CONSTANT FALSE ALARM RATE DETECTION | | | |
| 13 | 0.37686 | 0.22725 | -0.27595 |
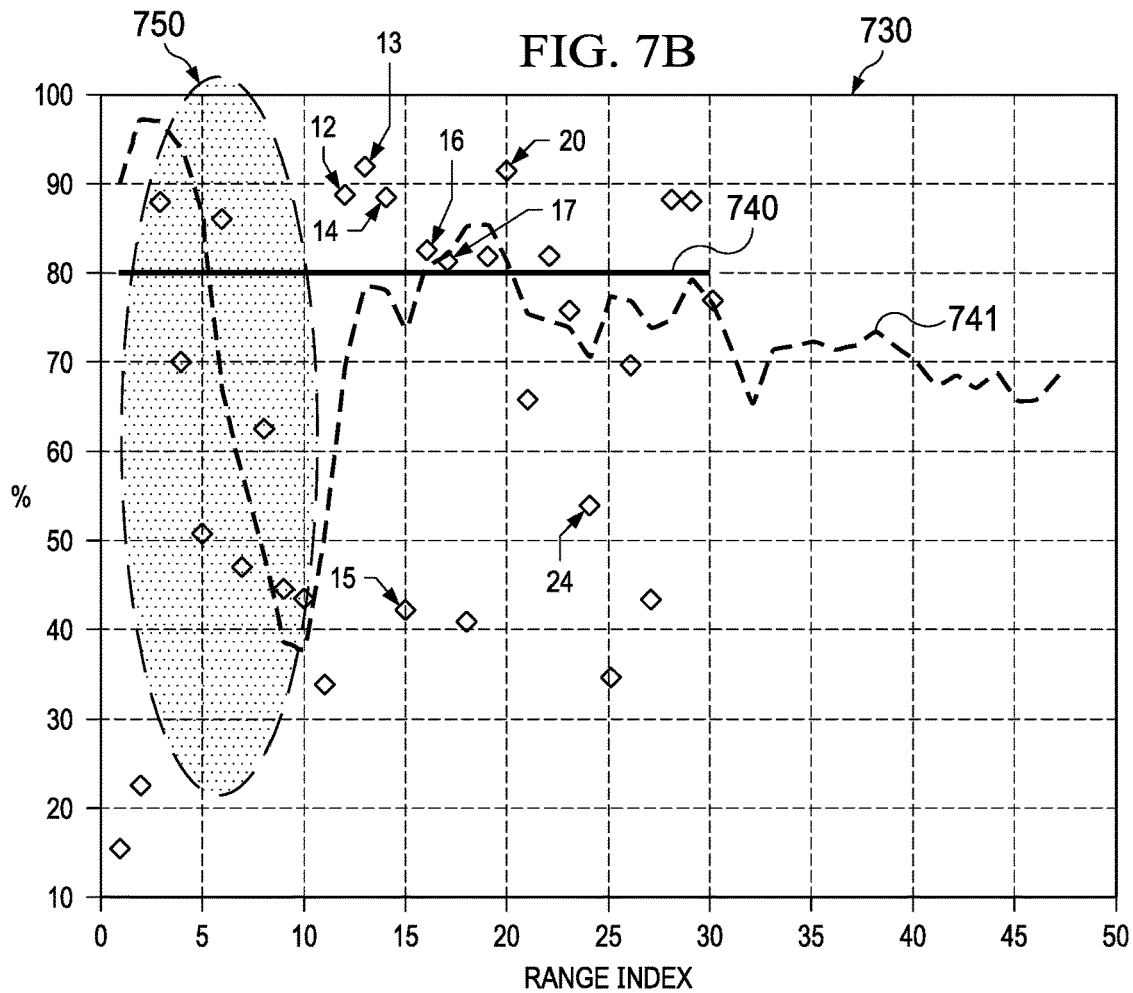
FIG. 7B

RADAR DATA PROCESSING USING NEURAL NETWORK CLASSIFIER AND CONFIDENCE METRICS

CROSS-REFERENCE TO RELATED APPLICATIONS

The present application claims priority to U.S. Provisional Patent Application No. 62/689,446, filed Jun. 25, 2018, titled "Improvements to Object Detection in Radars," which is hereby incorporated herein by reference in its entirety.

BACKGROUND

In a Frequency Modulated Continuous Wave (FMCW) radar system, a sinusoid signal whose frequency increases linearly over time, also known as a "chirp", is transmitted, and one or more objects around the FMCW radar system reflect the transmitted chirp. A sequence of equispaced chirps are transmitted in a unit called a frame. The FMCW radar system processes chirps and related reflections to analyze characteristics of the object. Exemplary characteristics include the range of an object relative to the radar origin, the velocity of an object relative to the radar original, and the angle of an object relative to a radar origin.

Each chirp and related reflections are signals with varying amplitude as a function of time. One example technique to analyze characteristics of the object(s) involves obtaining Fast Fourier Transform (FFT) output samples of a plurality of input signals, where each input signal includes a chirp and related reflections. By analyzing the FFT output samples, FMCW radar system have been used to identify presence of an object, range of an object relative to a radar origin, velocity of an object relative to a radar origin, and angle of an object relative to a radar origin. For angle identification, FFT output samples based at least in part on reflections received by different receiver antennas are analyzed.

SUMMARY

In accordance with at least one example of the disclosure, a radar data processing device comprises at least one analog-to-digital converter (ADC) configured to digitize a plurality of input signals, wherein each input signal includes radar chirp and radar chirp reflection information. The radar data processing device also comprises Fast Fourier Transform (FFT) logic configured to generate FFT output samples based on each digitized input signal, wherein the generated FFT output samples are associated with at least two of the plurality of receiver antennas. The radar data processing device also comprises a processor configured to determine a plurality of object parameters based on the generated FFT output samples, wherein the processor uses a neural network classifier trained to provide a confidence metric for at least one of the plurality of object parameters.

In accordance with at least one example of the disclosure, an integrated circuit comprises FFT logic configured to receive digitized input signals that include radar chirp and radar chirp reflection information received at a plurality of receiver antennas and to generate FFT output samples based on the digitized input signals, wherein the generated FFT output samples are associated with at least two of the plurality of receiver antennas. The integrated circuit also comprises a processor configured to determine a plurality of object parameters based on the generated FFT output samples, wherein the processor uses a neural network classifier trained to provide a confidence metric for at least one of the plurality of object parameters.

In accordance with at least one example of the disclosure, a method comprises digitizing a plurality of input signals, wherein each input signal includes radar chirp and radar chirp reflection information received at one of a plurality of receiver antennas. The method also comprises generating FFT output samples based on each digitized input signal, wherein the generated FFT output samples are associated with at least two of the plurality of receiver antennas. The method also comprises storing the generated FFT output samples. The method also comprises determining a plurality of object parameters based on the stored FFT output samples. The method also comprises providing a confidence metric for at least one of the plurality of object parameters based on at least some of the stored FFT output samples and a neural network classifier.

BRIEF DESCRIPTION OF THE DRAWINGS

For a detailed description of various examples, reference will now be made to the accompanying drawings in which:

FIG. 7A is a perspective view showing a radar data processing test scenario in accordance with various examples;

FIG. 7B is a graph showing results of the radar data processing test scenario of FIG. 7A in accordance with various examples;

FIG. 7C is a table showing results of the radar data processing test scenario of FIG. 7A in accordance with various examples;

DETAILED DESCRIPTION

Disclosed herein are radar data processing devices, systems, and methods, where a neural network classifier is used to provide a confidence metric for at least one object parameter. Example object parameters include, but are not limited to, an object range relative to a radar origin, an object velocity relative to a radar origin, and an object angle relative to a radar origin. As used herein, a "confidence metric" refers to a probability value that varies between two thresholds. An example probability value range is 0.0-1.0 (0%-100%). As used herein, a "neural network classifier" refers to a function that has been trained to provide an output for new inputs based on one or more training inputs. Over time, the training for the function can be updated as additional training inputs become available. In different examples, confidence metrics provided by the neural network classifier are used for object detection, object tracking (e.g., tracking object position, velocity, and/or angle over time), and/or updating a constant false alarm rate (CFAR) detection threshold.

In some examples, a neural network classifier is configured to provide a confidence metric for an object parameter based on Fast-Fourier Transform (FFT) output samples obtained for each of a plurality of input signals, where each input signal include chip and chirp reflection information. Also, in some examples, the plurality of input signals are obtained from different antennas to support object angle (e.g., azimuth/elevation) analysis relative to the radar origin.

Figure 1:
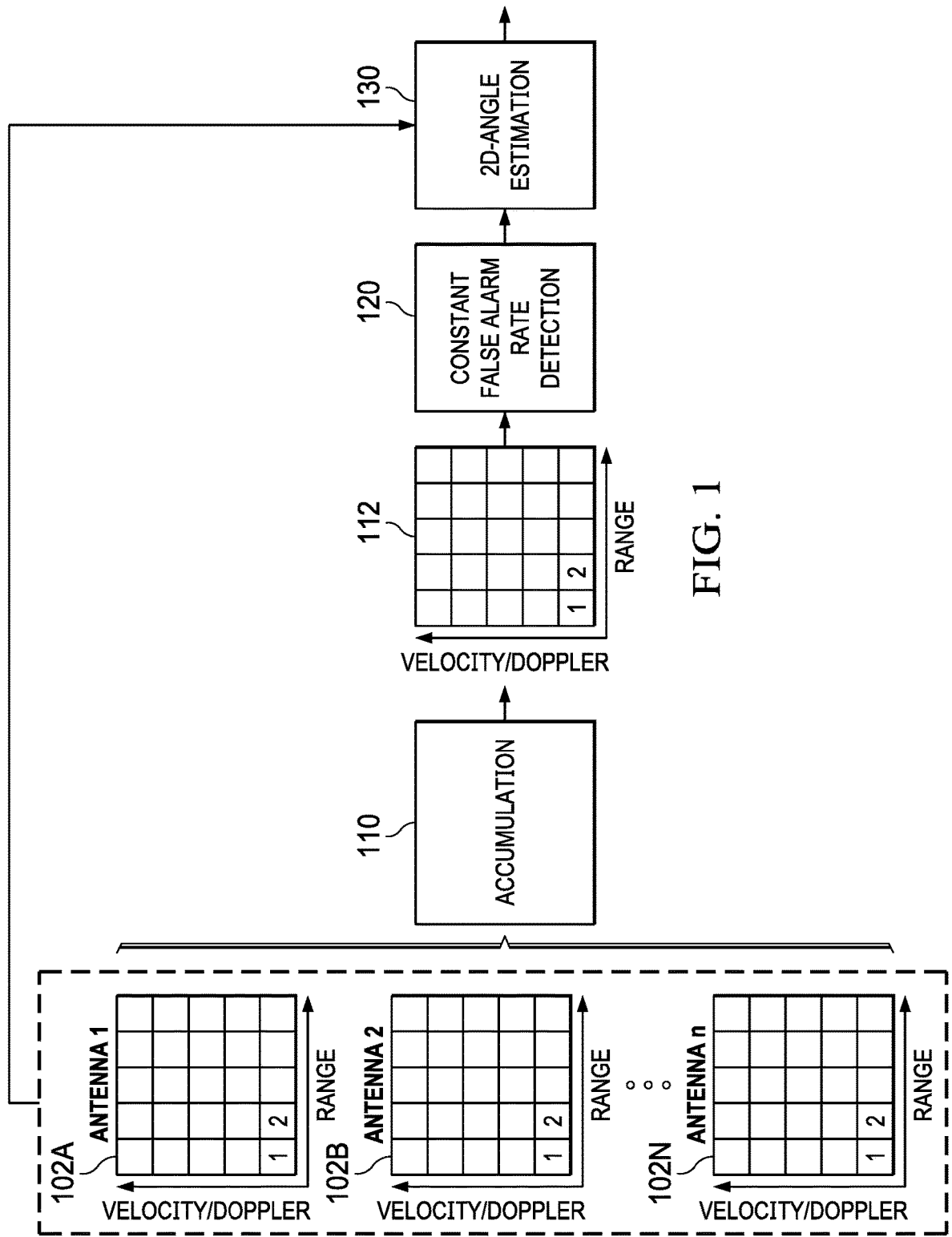
FIG. 1 is a block diagram showing an example radar data processing technique.

FIG. 1 shows a block diagram of an example radar data processing technique 100. In the technique 100, sets of FFT output samples 102A-102N obtained from the input signals of different antennas are represented. The sets of FFT output samples 102A-102N are combined by an accumulation process 110, resulting in a set of accumulated FFT output samples 112. The accumulation process is typically a non-coherent summation such as a summation of the absolute value of the corresponding bins of each the FFT output samples 102A-102N. The accumulated set of FFT output samples 112 are analyzed using a constant false alarm rate (CFAR) detection process 120. Thereafter, an angle estimation process 130 is performed for each detected object using the sets of FFT output samples 102A-102N. With the technique 100, detection and/or tracking of smaller objects and multiple objects is difficult.

By using a neural network classifier to provide confidence metric values as described herein, detection and/or tracking of smaller objects and/or multiple objects is improved compared to the radar data processing technique 100 described in FIG. 1. In some examples, the radar data processing device, system, and method options described herein are suitable for Frequency Modulated Continuous Wave (FMCW) radar data processing. To provide a better understanding, various radar data processing device, system, and method options involving a neural network classifier are described using the figures as follows.

Figure 2:
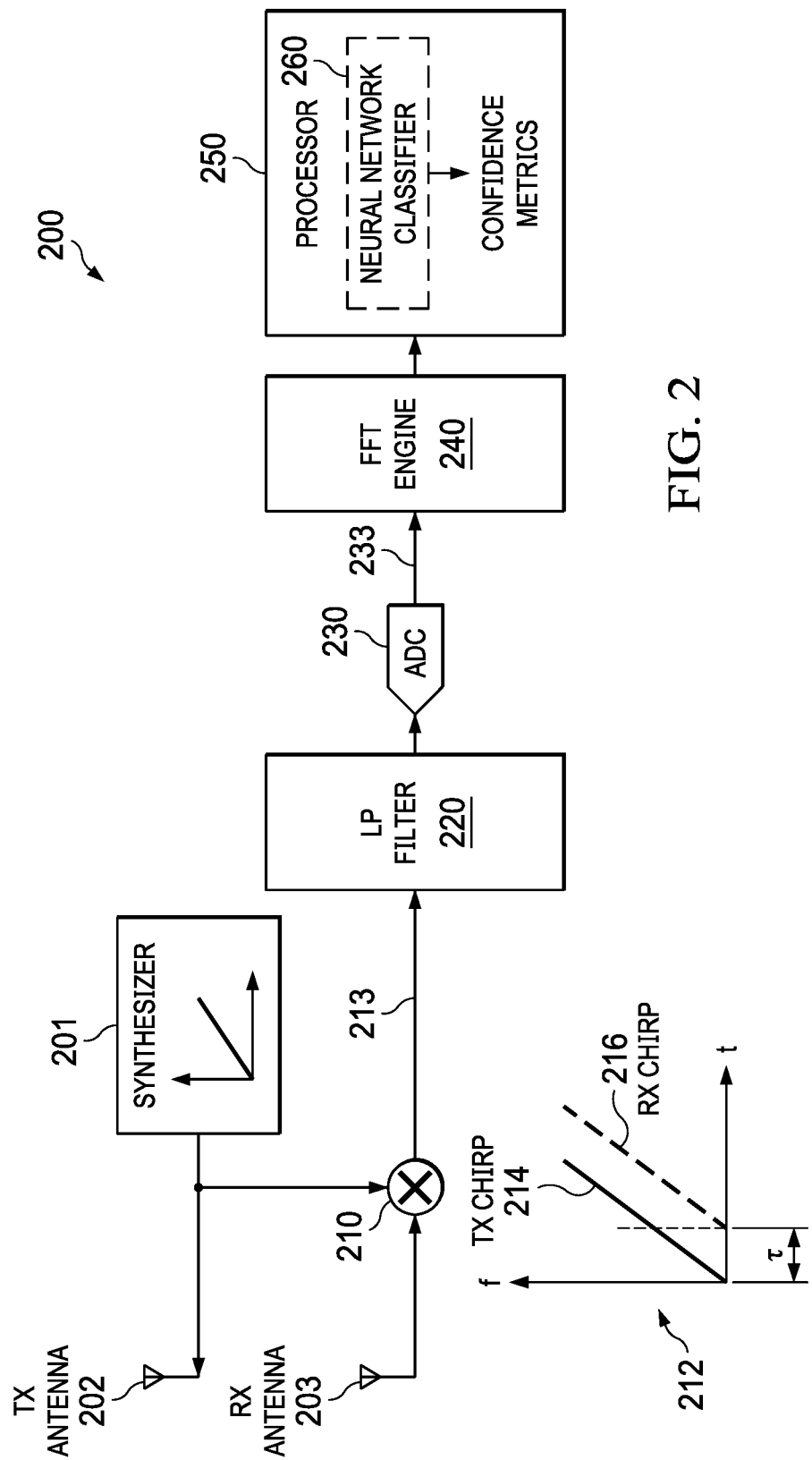
FIG. 2 is a block diagram showing a radar system in accordance with various examples.

FIG. 2 is a block diagram showing a radar system 200 in accordance with various examples. In the example of FIG. 2, the radar system 200 includes a synthesizer 201 configured to generate chirps, a TX antenna 202 for transmitting chirps generated by the synthesizer 201, and a RX antenna 203 for receiving chirp reflections in response to transmitted chirps. The radar system 200 also includes a mixer 210 that provides input signals 213 to a low-pass filter 220, where each input signal 213 includes information regarding a chirp 214 and any chirp reflections 216. The graph 212 shows frequency relative to time to illustrate a chirp 214 and a chirp reflection 216 (i.e., the chirp 214 is a signal with increasing frequency as a function of time, and the chirp reflection 216 is a delayed version of the chirp 214). In some examples, the mixer 210 outputs a sinusoid wave with a frequency equal to the difference between the instantaneous frequency of the chirp 214 and the instantaneous frequency of the chirp reflection 216 (delayed by time τ) in graph 212. In other words, the phase of the sinusoid wave generated by the mixer 210 is equal to the difference of the phase of the chirp 214 and the phase of the chirp reflection 216.

Each of the input signals 213 is filtered by the low-pass filter 220 and is digitized by an analog-to-digital converter (ADC) 230. The output of the ADC 230 is digitized input signals 233, where each of the digitized input signals 233 includes chirp and chirp reflection information. Each of the digitized input signals 233 is provided to an FFT engine 240, which provides FFT output samples for each of the digitized input signals 233. In different examples, the component topology for the FFT engine 240 varies. Regardless of the particular component topology, the FFT engine 240 provides or stores FFT samples for use by a processor 250 to determine object parameters for one or more objects that cause chirp reflections 316. Example object parameters include object position, object velocity, and object angle relative to a radar origin (the location of the radar system 200).

As represented in FIG. 2, the processor 250 also uses a neural network classifier 260 to determine confidence metrics. In some examples, the neural network classifier 260 is implemented using hardware of the processor 250. In other examples, the neural network classifier 260 is implemented using software or instructions executed by the processor 250. In either case, the neural network classifier 260 provides a confidence metric for at least one object parameter based on FFT output samples provided by the FFT engine 240. In different examples, confidence metrics provided by the neural network classifier 260 are used for object detection, object tracking (e.g., tracking object position, velocity, and/or angle over time), and/or updating a CFAR detection threshold.

In some examples, the neural network classifier 260 is configured to provide a confidence metric for an object parameter based on FFT output samples obtained for each of a plurality of input signals, where each input signal include chip and chirp reflection information. Also, in some examples, the plurality of input signals are obtained from different antennas to support object angle (e.g., azimuth/elevation direction of arrival) analysis relative to the radar origin. In different examples, the confidence metric is based on at least one of: strength of signals received by at least two receiver antennas; a pattern of signals received by at least two receiver antennas; a distribution of FFT output samples as a function of range and Doppler; and a distribution of FFT output samples as a function of elevation and azimuth.

In some examples, the neural network classifier 260 comprises an artificial neural network (ANN) trained to provide a confidence metric for direction of arrival (angle) data obtained using the available FFT output samples. In such examples, the direction of arrival data is a function of azimuth and elevation. Also, in some examples, the neural network classifier 260 is trained to only analyze FFT output samples and to provide a confidence metric for an object parameter associated with a previously detected object. In other examples, the neural network classifier 260 is trained to analyze FFT output samples and to provide a confidence metric used for object detection. In some examples, the neural network classifier 260 is trained to analyze FFT output samples and to provide a confidence metric used for object tracking. In some examples, the processor 250 adjusts a threshold used for CFAR detection based on confidence metric results provided by the neural network classifier.

Figure 3:
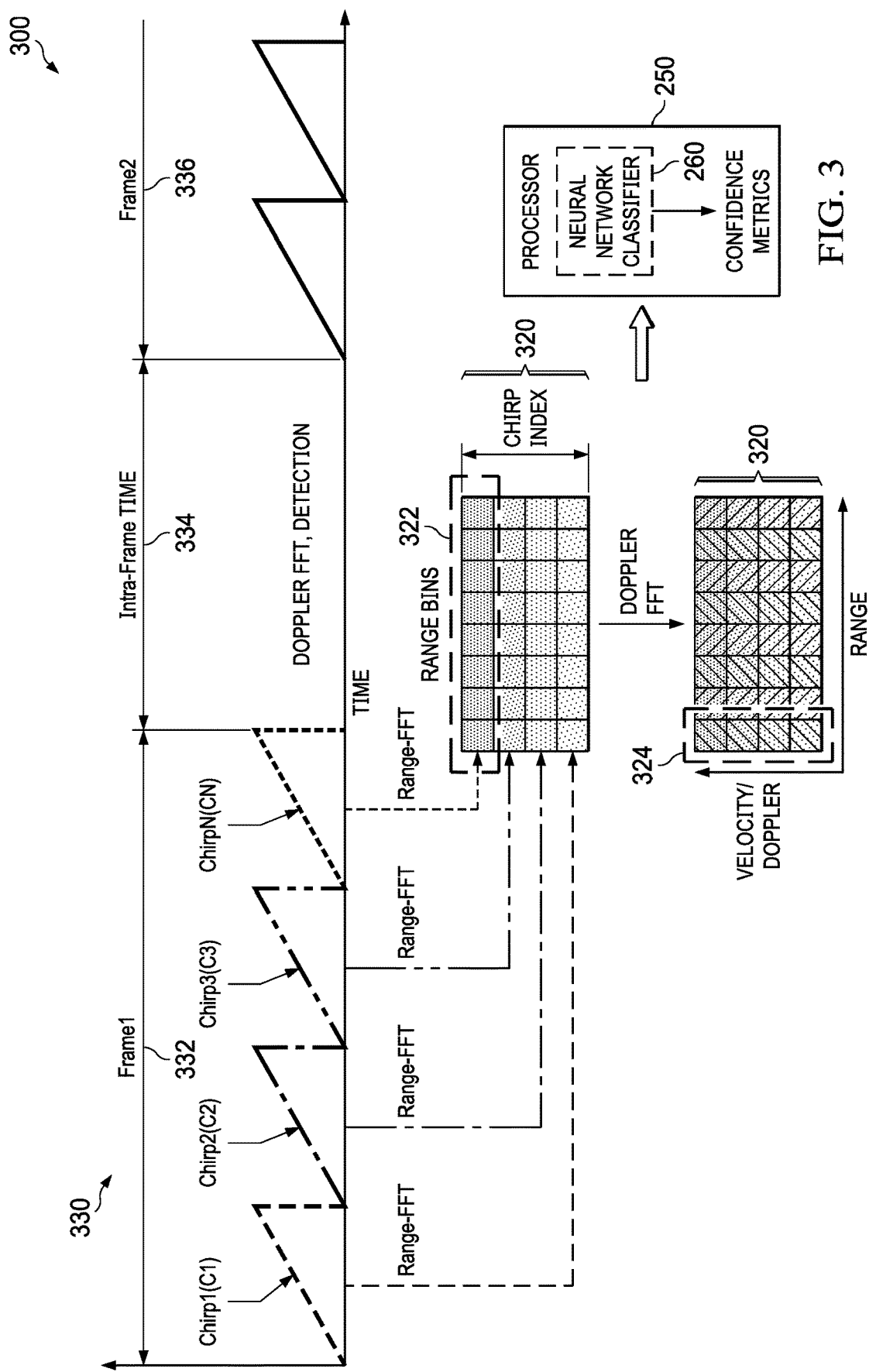
FIG. 3 is a block diagram showing part of a radar data processing system in accordance with various examples.

FIG. 3 is a block diagram showing part of a radar data processing system 300 in accordance with various examples. In the example of FIG. 3, the radar data processing system 300 includes the processor 250 introduced in FIG. 2. Also represented in FIG. 3 is a graph 330 showing example radar data processing operations related to frame 332 and intra-frame time 334. More specifically, radar data processing operations related to four chirps (C1-CN) of frame 332 are represented, where the radar data processing operations involve obtaining FFT output samples 320 by an FFT engine such as the FFT engine 240 in FIG. 2. More specifically, during frame 332, FFT output samples 320 are organized into range bins indexed by chirp number. These FFT output samples 320 are stored (e.g., in a computer-readable memory device) for use by the processor 250.

For example, the FFT output samples 320 are used to perform a range analysis 322. Example operations for the range analysis 322 involve using at least some of the FFT output samples 320 for individual chirps to determine the range of one or more objects relative to a radar origin. Thereafter, during the intra-frame time 334, the FFT output samples 320 are used to perform a Doppler analysis 324. Example operations for the Doppler analysis 324 involve analyzing each range bin across chirps using the FFT output samples 320 to determine the velocity of one or more objects relative to a radar origin. More specifically, in some examples, the range analysis 322 and Doppler analysis 324 are performed by the processor 250.

As previously discussed, the processor 250 includes a neural network classifier 260 configured to provide confidence metrics. In some examples, confidence metrics provided by the neural network classifier 260 is used for object detection that precedes or is part of the range analysis 322 and/or the Doppler analysis 324. Additionally or alternatively, confidence metrics provided by the neural network classifier 260 applies to one or more range values obtained from the range analysis 322. Additionally or alternatively, confidence metrics provided by the neural network classifier 260 applies to one or more velocity values obtained from the Doppler analysis 324.

Figure 4:
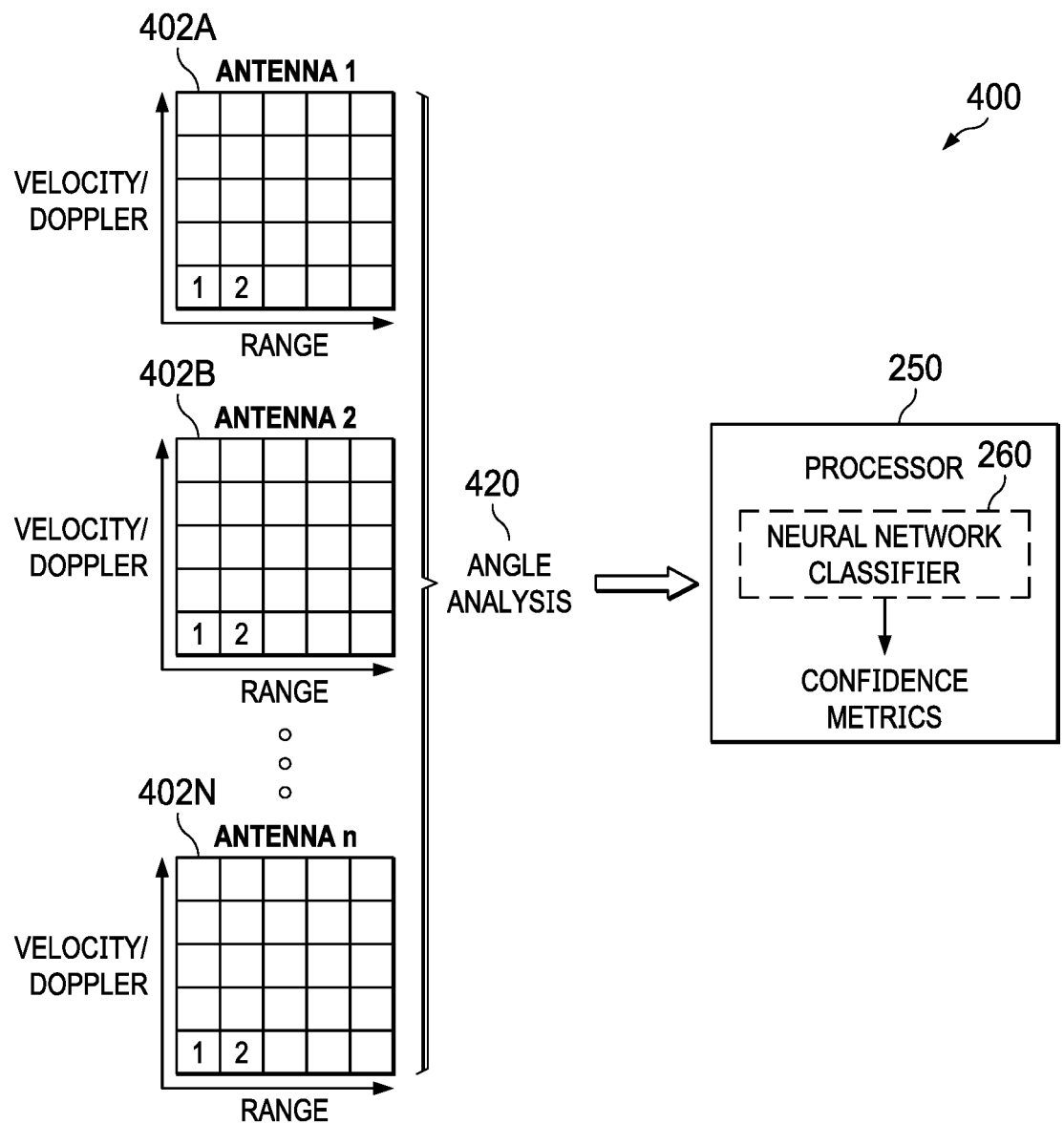
FIG. 4 is a block diagram showing other radar data processing operations in accordance with various examples.

FIG. 4 is a block diagram showing other radar data processing operations 400 in accordance with various examples. In FIG. 4, a plurality of sets of FFT output samples 402A-402N are obtained from respective receiver antennas. When sets of FFT output samples 402A-402N corresponding to different receiver antennas are available, angle analysis 420 can be performed using at least some of the sets of FFT output samples 402A-402N. Example operations for the angle analysis 420 involve using at least some FFT output samples from two or more sets of FFT output samples 402A-402N to determine the angle (e.g., azimuth/elevation or direction of arrival) of one or more objects relative to a radar origin. In different examples, the angle analysis 420 is performed during a frame (e.g., frame 332) in which FFT output samples are generated and stored by an FFT engine and/or during an intra-frame time (e.g., the intra-frame time 334). Example operations for the angle analysis 420 involve analyzing particular bins (i.e., bins with the same range/Doppler index) across different sets of FFT output samples 402A-402N to determine the angle of one or more objects relative to a radar origin.

As previously discussed, the processor 250 includes a neural network classifier 260 configured to provide a confidence metric. In some examples, the confidence metric provided by the neural network classifier 260 is used for object detection that precedes or is part of the angle analysis 420. Additionally or alternatively, the confidence metric provided by the neural network classifier 260 applies to one or more angle values obtained from the angle analysis 420.

Figure 5:
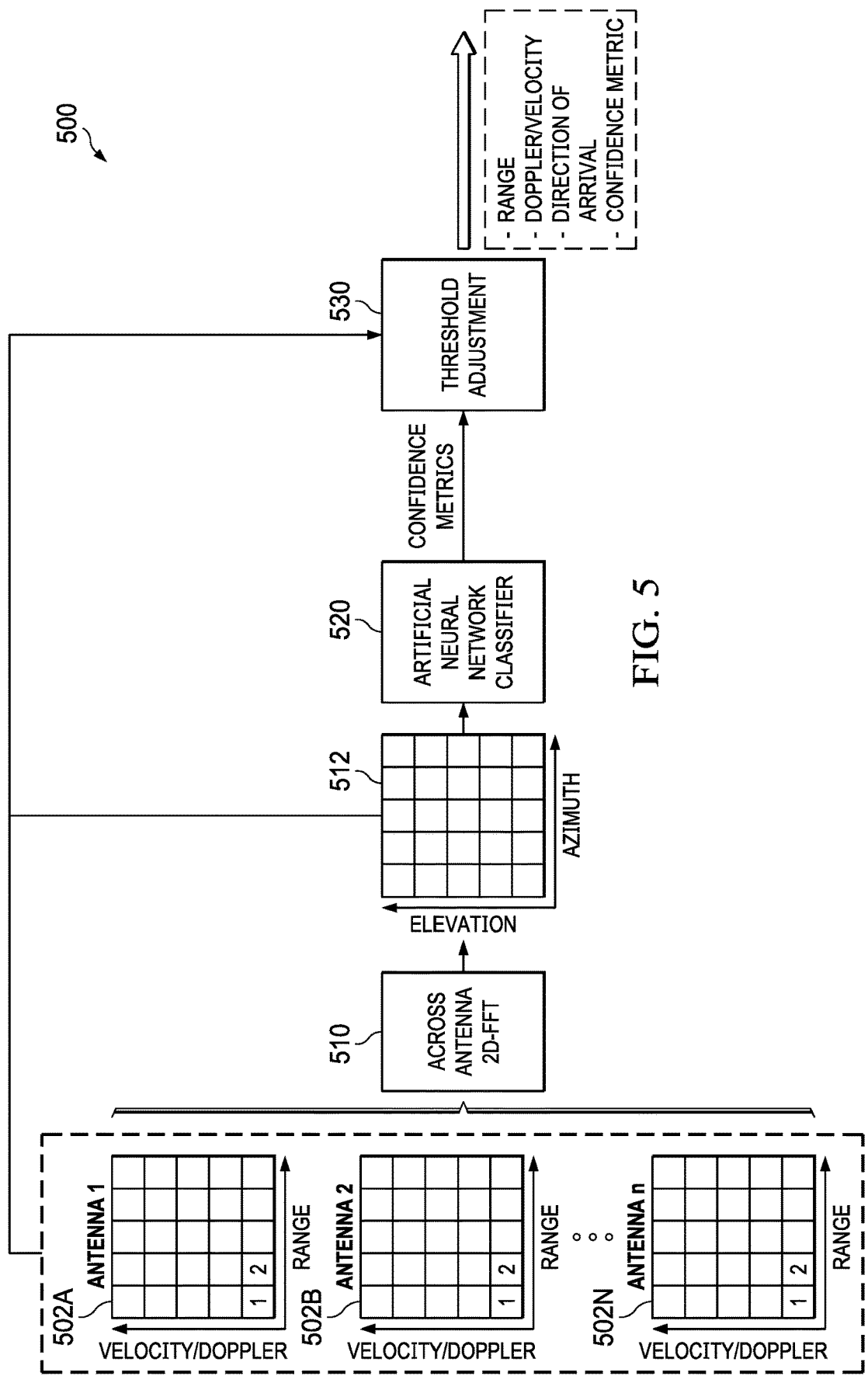
FIG. 5 is a block diagram showing a radar data processing technique in accordance with various examples.

FIG. 5 is a block diagram showing a radar data processing technique 500 in accordance with various examples. In the radar data processing technique 500 of FIG. 5, a plurality of sets of FFT output samples 502A-502N are obtained from respective receiver antennas and an FFT engine (e.g., FFT engine 240). In some examples, the radar data processing technique 500 involves across antenna 2D-FFT operations 510 (e.g., performed by an FFT engine such as the FFT engine 240, or performed by a processor such as the processor 250) that result in a set of across antenna FFT output samples 512 for different elevations and azimuths. The across antenna 2D-FFT operations 510 involve an FFT operation on corresponding bins (bins with the same range/Doppler index) across the Antennas 1 through N. The other operations represented in the radar data processing technique 500 are performed by a processor such as the processor 250. For example, after the set of across antenna FFT output samples 512 are obtained, ANN classifier operations 520 are performed to determine confidence metrics associated with angle values (direction of arrival values) determined from the set of across antenna FFT output samples 512. In some examples, the ANN classifier operations 520 are performed by a neural network classifier such as the neural network classifier 260.

In some examples, the confidence metrics provided by the ANN classifier operations 520 are used to perform threshold adjustment operations 530. More specifically, the threshold adjustment operations 530 may involve decreasing a CFAR threshold in response to at least one confidence metric from the ANN classifier operations 520 being greater than a threshold. When the CFAR threshold is decreased, object detection is more sensitive (the probability of detecting smaller and/or more objects is increased at the cost of increasing the probability of false object detection). On the other hand, when the CFAR threshold is increased, object detection is less sensitive (the probability of detecting smaller and/or more objects is decreased with the benefit of decreasing false object detection). In some examples, the threshold adjustment operations 530 given above, confidence metrics provided by the ANN classifier operations 520 are used to determine when to increase or decrease the CFAR threshold. Also, confidence metrics provided by the ANN classifier operations 520 can be used to determine the amount of increase or decrease in the CFAR threshold.

In some examples, the ANN classifier operations 520 identify presence of one or more objects by analyzing signal strength and/or coherency information provided by the across antenna FFT output samples 512. For example, if the ANN classifier operations 520 determine that an object is present, a confidence metric indicating a probability of the object being present is output. More specifically, in some examples, the ANN classifier operations 520 involve determining the confidence metric based on a signal strength cleanliness analysis of the across antenna FFT output samples 512. In one example, if the spectrum the across antenna FFT output samples 512 indicates that signal strength is scattered around a large number of elevation-azimuth bins, the ANN classifier operations 520 provide a confidence metric that indicates the probability of an object present in the corresponding range-Doppler bin is low. Conversely, if the spectrum of the across antenna FFT output samples 512 indicates that signal strength is concentrated around a limited number of elevation-azimuth bins, the ANN classifier operations 520 provide a confidence metric that indicates the probability of an object present in the corresponding range-Doppler bin is high. In this manner, object parameters determined by the radar data processing technique 500 of FIG. 5 are not based solely on signal-to-noise ratio (SNR).

As part of the threshold adjustment operations 530 and/or after the threshold adjustment operations 530, the set of FFT output samples 502A-502N are used to determine object parameters such as range, velocity, and direction of arrival (DOA). As desired, the ANN classifier operations 520 involve analyzing available FFT output samples (e.g., the sets of FFT output samples 502A-502N and/or the FFT output samples 512) to provide a confidence metric for one or more object parameters such as range, velocity, and DOA. In some examples, confidence metrics provided by the ANN classifier operations 520 are used for object tracking.

Figure 6:
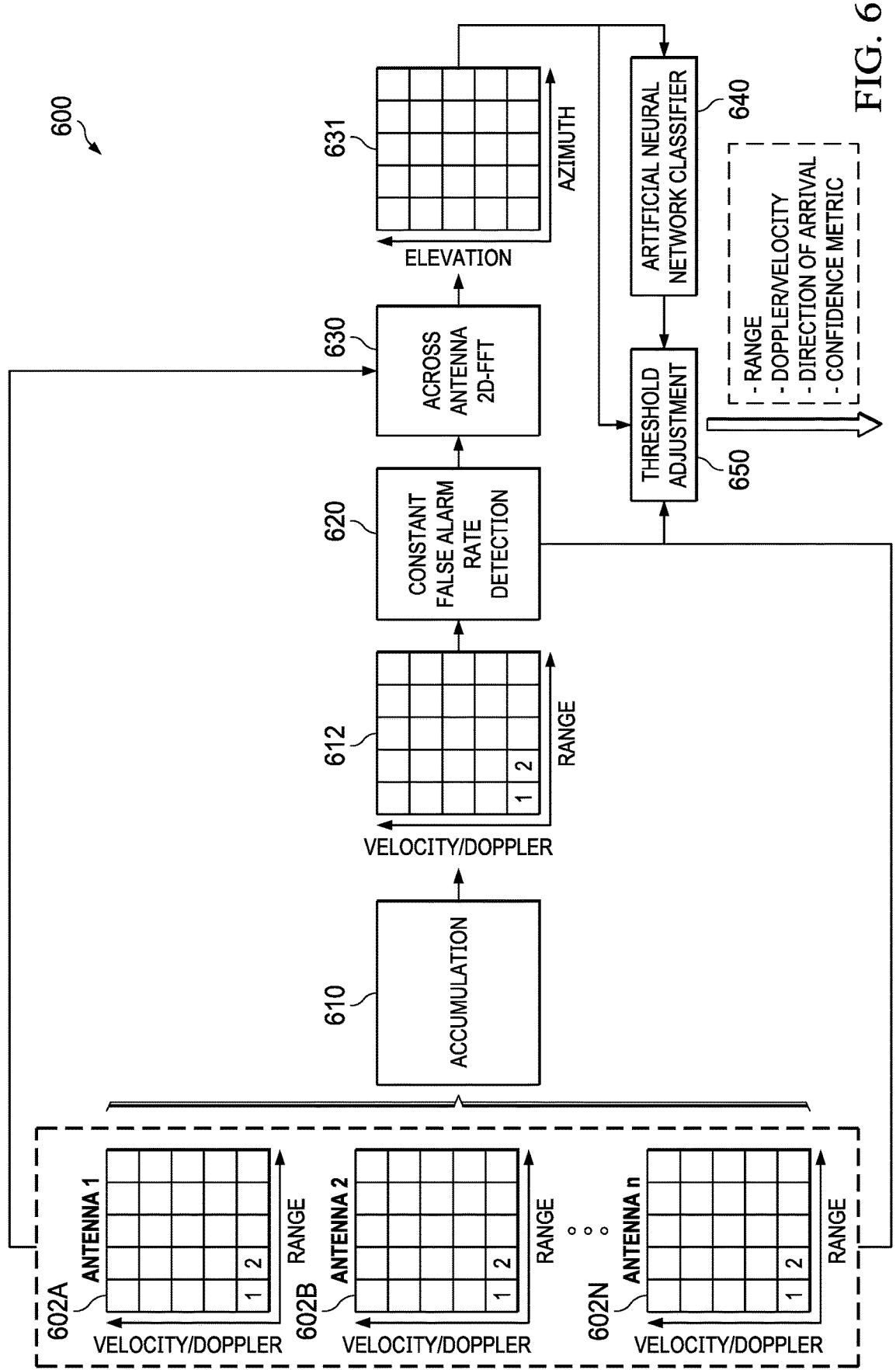
FIG. 6 is a block diagram showing another radar data processing technique in accordance with various examples.

FIG. 6 is a block diagram showing another radar data processing technique 600 in accordance with various examples. In the radar data processing technique 600 of FIG. 6, a plurality of sets of FFT output samples 602A-602N are obtained from respective receiver antennas and an FFT engine (e.g., FFT engine 240). In some examples, the radar data processing technique 600 involves accumulation operations 610 (e.g., performed by an FFT engine such as the FFT engine 240, or performed by a processor such as the processor 250) that result in a set of accumulated FFT output samples 612 with accumulated bins values as a function of range and Doppler. The radar data processing technique 600 also includes CFAR detection operations 620 performed by a processor such as the processor 250, where the CFAR detection operations 620 use the set of accumulated FFT output samples 612 provided by the accumulation operations 610 to detect the presence of objects.

If one or more objects are detected by the CFAR detection operations 620, across antenna 2D-FFT operations 630 are performed (e.g., by an FFT engine such as the FFT engine 240, or by a processor such as the processor 250), resulting in a set of across antenna FFT output samples 631 for different elevations and azimuths. Note that the operation 630 is repeated for the range-Doppler bin corresponding to each detected object. In some examples, the radar data processing technique 600 includes ANN classifier operations 640 that provide confidence metrics based on the set of across antenna FFT output samples 631.

In some examples, the confidence metrics obtained from the ANN classifier operations 640 are used for threshold adjustment operations 650. More specifically, the threshold adjustment operations 650 may involve decreasing a CFAR threshold in response to at least one confidence metric from the ANN classifier operations 640 being greater than a threshold. When the CFAR threshold is decreased, object detection is more sensitive (the probability of detecting smaller and/or more objects is increased at the cost of increasing the probability of false object detection). On the other hand, when the CFAR threshold is increased, object detection is less sensitive (the probability of detecting smaller and/or more objects is decreased with the benefit of decreasing false object detection). In the example threshold adjustment operations 650, confidence metrics provided by the ANN classifier operations 640 are used for determining when to increase or decrease the CFAR threshold. Also, confidence metrics provided by the ANN classifier operations 640 can be used to determine the amount of increase or decrease in the CFAR threshold.

In some examples, the ANN classifier operations 640 provide a confidence metric based on a signal strength cleanliness analysis of the across antenna FFT output samples 631. In one example, if the spectrum the across antenna FFT output samples 631 indicates that signal strength is scattered around a large number of azimuth-elevation bins, the ANN classifier operations 640 provide a confidence metric that indicates the probability of an object present at the corresponding range-Doppler bin is low. Conversely, if the spectrum of the across antenna FFT output samples 631 indicates that signal strength is concentrated around a limited number of azimuth-elevation bins, the ANN classifier operations 640 provide a confidence metric that indicates the probability of an object present at the corresponding range-Doppler bin is high. In this manner, object parameters determined by the radar data processing technique 600 of FIG. 6 are not based solely on SNR.

As part of the threshold adjustment operations 650 and/or after the threshold adjustment operations 650, the set of FFT output samples 602A-602N are used to determine object parameters such as range, velocity, and direction of arrival (DOA). As desired, the ANN classifier operations 640 involve analyzing available FFT output samples (e.g., the sets of FFT output samples 602A-602N, the accumulated FFT output samples 612 and/or the across antenna FFT output samples 631) to provide a confidence metric for one or more object parameters such as range, velocity, and DOA. In some examples, confidence metrics provided by the ANN classifier operations 640 are used for object tracking.

FIG. 7A is a perspective view showing a radar data processing test scenario 700 in accordance with various examples. In FIG. 7A, the object to be detected by radar system 720 is a plastic cone 710, where x, y, and z coordinates are represented. In FIG. 7B, a graph 730 showing results of the radar data processing test scenario of FIG. 7A is represented. In graph 730, FFT output samples are represented by curve 741 according to range index and magnitude. Also represented in the graph 730 are the confidence metrics (the diamond icons in graph 730) computed for each range-bin. Note that in graph 730, the y-axis represents the value of the confidence metric as a percentage (i.e., in the range 0-100 corresponding to a metric value between 0 and 1). Also note that for convenience, the curve 741 representing the FFT samples has been suitably scaled by a proportionality constant to fit in the same y-axis scale. The line 740 represents the value of the detection threshold (all range-bins with a confidence metric above this value are considered to be bins with an object present). As shown in graph 730, bins with range indices 12, 13, 14, 16, 17, and 20 are above line 740, which indicates the cut-off probability of the radar system 720. In other words, for the example of FIG. 7B, the radar system 720 ignores the bins with a confidence metric less than 80% (0.8), which is below the line 740. The bins with a confidence metric lower than 80% include the bins with range indices 15 and 24. The area 750 in the graph 730 indicates a leakage range (e.g., too close to the radar system 720). For the graph 730, a concentration of FFT output samples above the line 740 and outside of the area 750 are used to provide a range value for the cone 710 relative to the radar system 720.

FIG. 7C is a table 760 showing results of the radar data processing test scenario of FIG. 7A. The values in the table 760 are relative to the origin of the radar system 720. More specifically, the radar system 720 is assumed to be 0.5 meters above ground, and the center of the plastic cone 710 is located at x, y coordinate (0.45, 0.3). The FFT output sample information for range index 12 informs the radar system 720 of an object present at x, y, z coordinate (0.35562, 0.20817, −0.23791). Similarly, the FFT output sample information of range index 13 informs of an object at x, y, z coordinate (0.37659, 0.22709, −0.27576).

Because the confidence metric of each of bins with range indices 12, 13, 14, 16, 17, and 20 are above the cut-off line 740, the radar system 720 recognizes that the object information from these bins are not false. The radar system 720 further ignores the FFT output sample information from bins with range indices 17 and 20 because the z coordinate associated with these bins indicates an object below ground level (the z coordinate values are greater than 0.5 meters below the level of the radar system 720).

Similarly, the radar system 720 recognizes that the FFT output sample information from bins with range indices 15 and 24 has a confidence metric lower than the line 740 and thus interpret these bins as false positives. As desired, the radar system 720 relies on the information available from multiple bins with different range indices, where each bin's probability is taken into account. In this manner, the radar system 720 acquires more holistic information for the plastic cone 710 reflecting a radar chirp. (The radar system 720 identifies multiple reflecting points (corresponding to range indices 12, 13, 14, and 16) from the plastic cone 710. It thus recognizes that the plastic cone 710 is an extended object presenting multiple reflections to the signals from the radar). In contrast, the radar data processing technique 100 discussed in FIG. 1 would provide a single x, y, z coordinate (0.37686, 0.22725, −0.27595) for a plastic cone.

Figure 8:
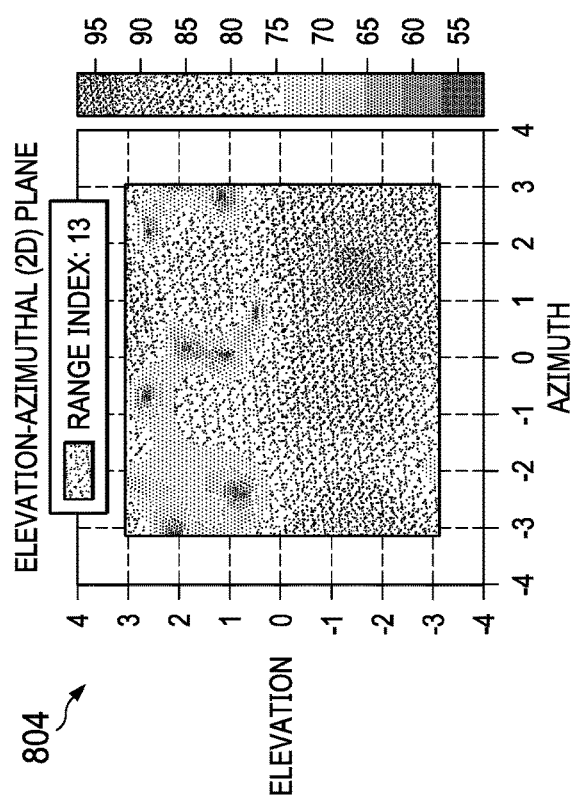
FIG. 8 includes graphs showing Fast-Fourier Transform (FFT) output sample signal strength as a function election and azimuth in accordance with various examples.
Figure 8:
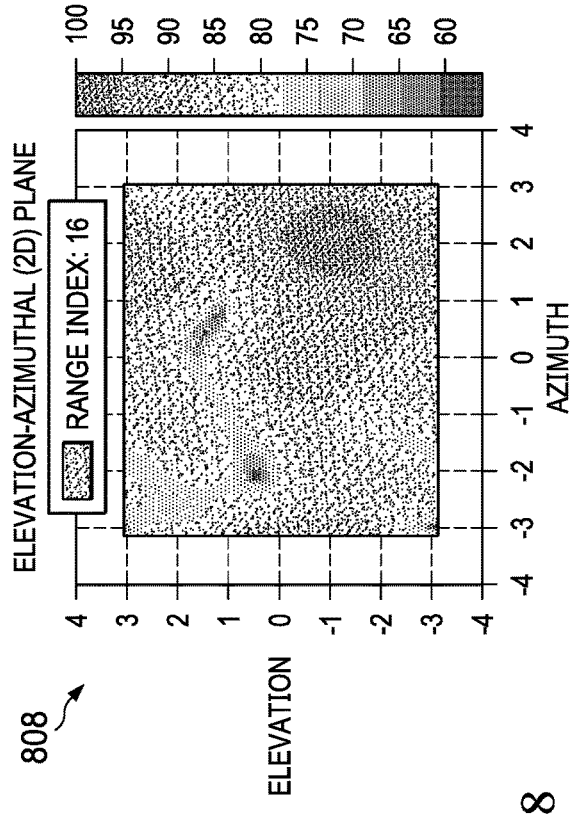
Figure 8:
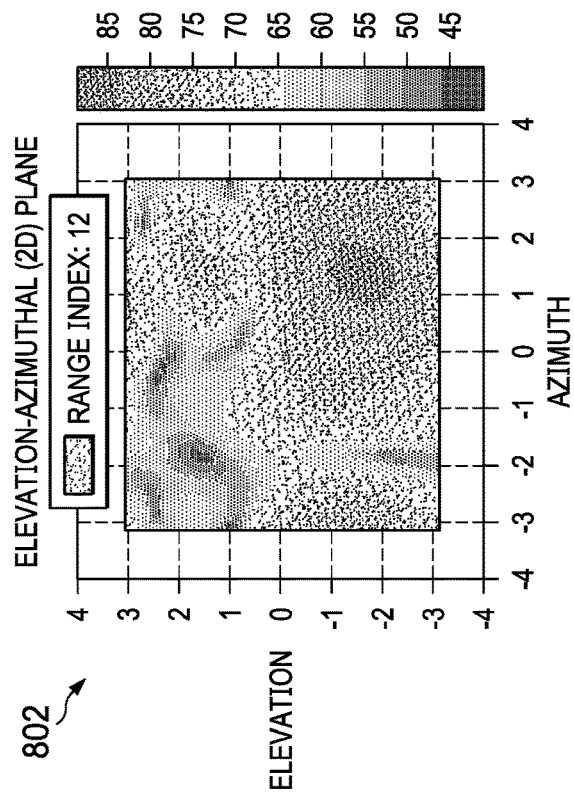
Figure 8:
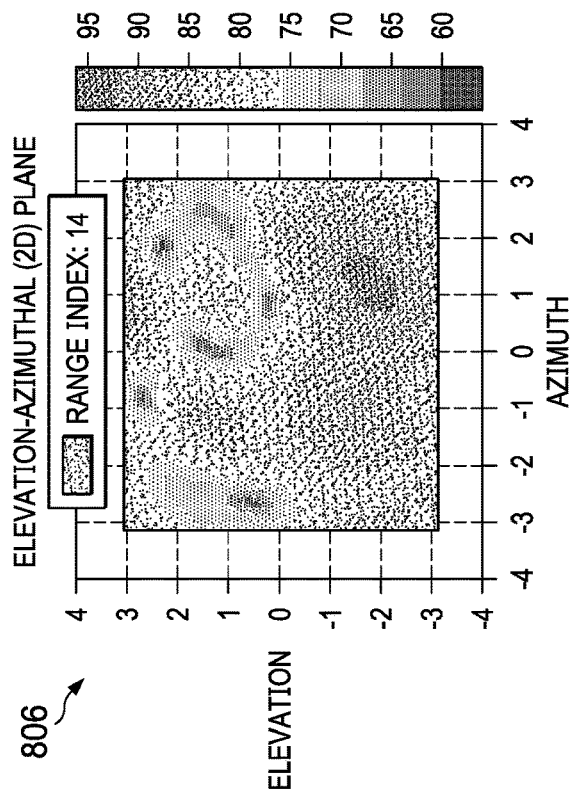

FIG. 8 includes graphs 802, 804, 806, and 808 showing FFT output sample signal strength as a function of elevation and azimuth in accordance with various examples. More specifically, each of the graphs 802, 804, 806, and 808 corresponds to range indexes from FIGS. 7A-7C that have a high probability of object presence (e.g., range indexes 12, 13, 14, 16). In graphs 802, 804, 806, and 808, there is signal strength coherency for the range indexes represented as a function elevation and azimuth (a single peak is present). Thus, presence of an object at a range corresponding to these range indexes represented is interpreted by a radar system such as the radar system 720 as likely.

Figure 9:
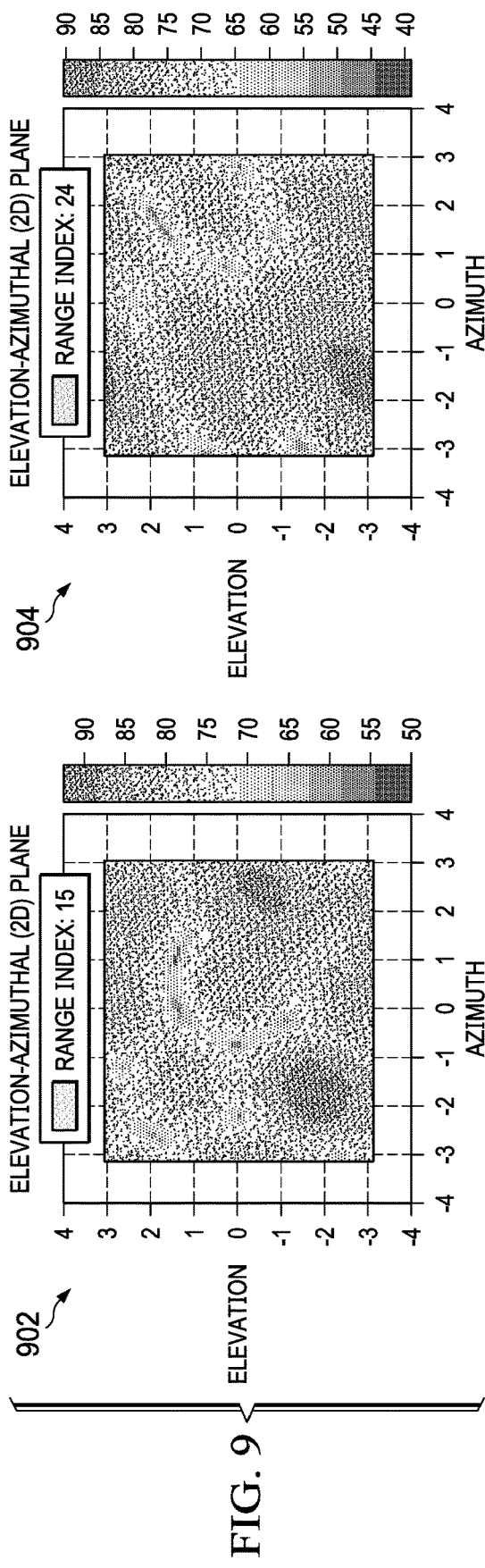
FIG. 9 includes other graphs showing FFT output sample signal strength as a function election and azimuth in accordance with various examples.

FIG. 9 includes graphs 902 and 904 showing FFT output sample signal strength as a function of elevation and azimuth in accordance with various examples. More specifically, each of the graphs 902 and 904 corresponds to range indexes (e.g., range indexes 15 and 24 in FIGS. 7A-7C) with a low probability of object presence. As shown in graphs 902 and 904, there is not signal strength coherency for the range indexes represented as a function elevation and azimuth (multiple peaks are present). Thus, presence of an object at a range corresponding to these range indexes represented is interpreted by a radar system such as the radar system 720 as unlikely.

Figure 10:
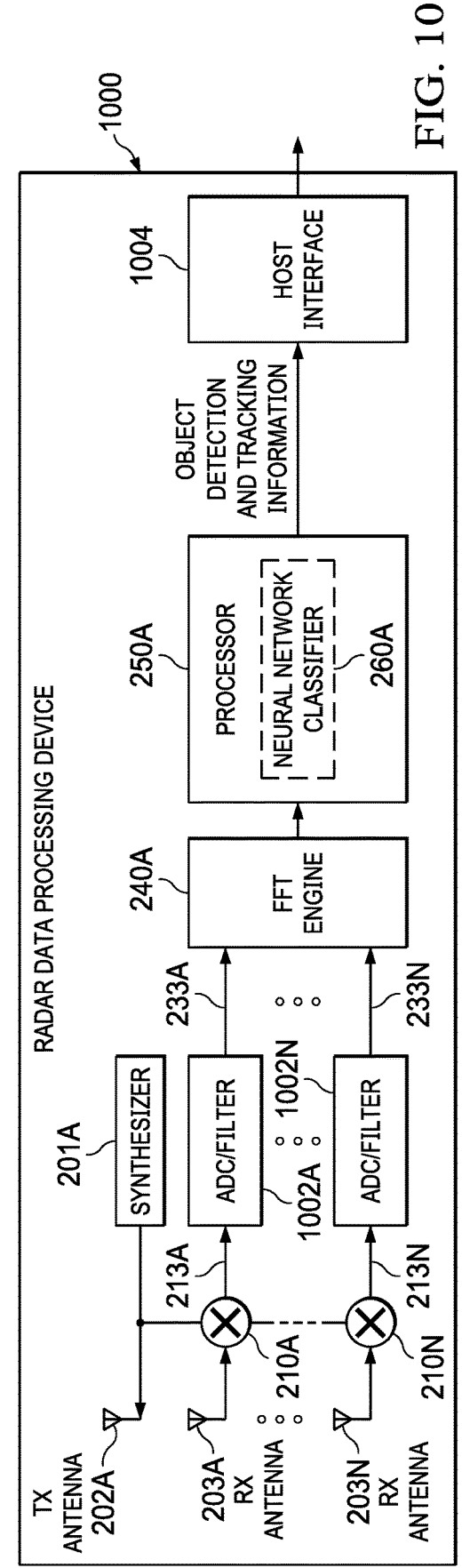
FIG. 10 is a block diagram showing a radar data processing device in accordance with various examples.

FIG. 10 is a block diagram showing a radar data processor device 1000 in accordance with various examples. In different examples, the radar data processor device 1000 corresponds to an integrated circuit, a multi-die module, a printed circuit board (PCB) with components, and/or other radar data processing device options. As shown, the radar data processor device 1000 includes a synthesizer 201A (an example of the synthesizer 201 in FIG. 2), a transmitter antenna 202A (an example of the transmitter antenna 202 in FIG. 2), a plurality of receiver antennas 203A-203N (examples of the receiver antenna 203 in FIG. 2), and mixers 210A-210N (examples of the mixer 210 in FIG. 2). The output of the mixers 210A-210N are used as input signals 213A-213N (examples of the input signal 213) that include chirp and chirp reflection information. In some examples, the transmitter antenna 202A and/or the receiver antennas 203A-203N are separate from the other components represented for the radar data processor device 1000 (e.g., the transmitter antenna 202A and/or the receiver antennas 203A-203N are on-chip or off-chip in different examples). Also, it should be appreciated that the receiver antennas 203A-203N are spaced from each other. Also, in some examples, the transmitter antenna 202A is usable as one of the receiver antennas 203A-203N and vice versa (with appropriate circuitry to connect/disconnect an antenna to other components as desired). At least one antenna is needed, with multiple antennas providing redundancy, angle information, and/other radar system options.

The radar data processor device 1000 also includes an ADC/filter 1002A-1002N for each of the input signals 213A-213N to filter and digitize the input signal 213A-213N. As shown, the radar data processor device 1000 also includes an FFT engine 240A (an example of the FFT engine 240 in FIG. 2) configured to provide FFT output samples as described herein for each of the digitized input signals 233A-233N. A processor 250A (an example of the processor 250 in FIG. 2) with a neural network classifier 260A (an example of the neural network classifier 260 in FIG. 2) provides confidence metrics based on FFT output samples provided by the FFT engine 240A and/or the processor 250A. In different examples, the confidence metrics provided by the neural network classifier 260A are used for object detection, object tracking (e.g., tracking object position, velocity, and/or angle over time), and/or updating a CFAR detection threshold.

As shown, the radar data processor device 1000 also includes a host interface 1004 configured to receive object detection and tracking info from the processor 250A. As desired, confidence metrics for each detected object and/or related object parameters is provided to the host interface 1004. The host interface 1004 supports communications to or from other components so that results of the radar data processor device 1000 are displayed and/or are used by a radar system. Also, certain features of the radar data processing device 1000 are programmable via the host interface 1004.

Figure 11:
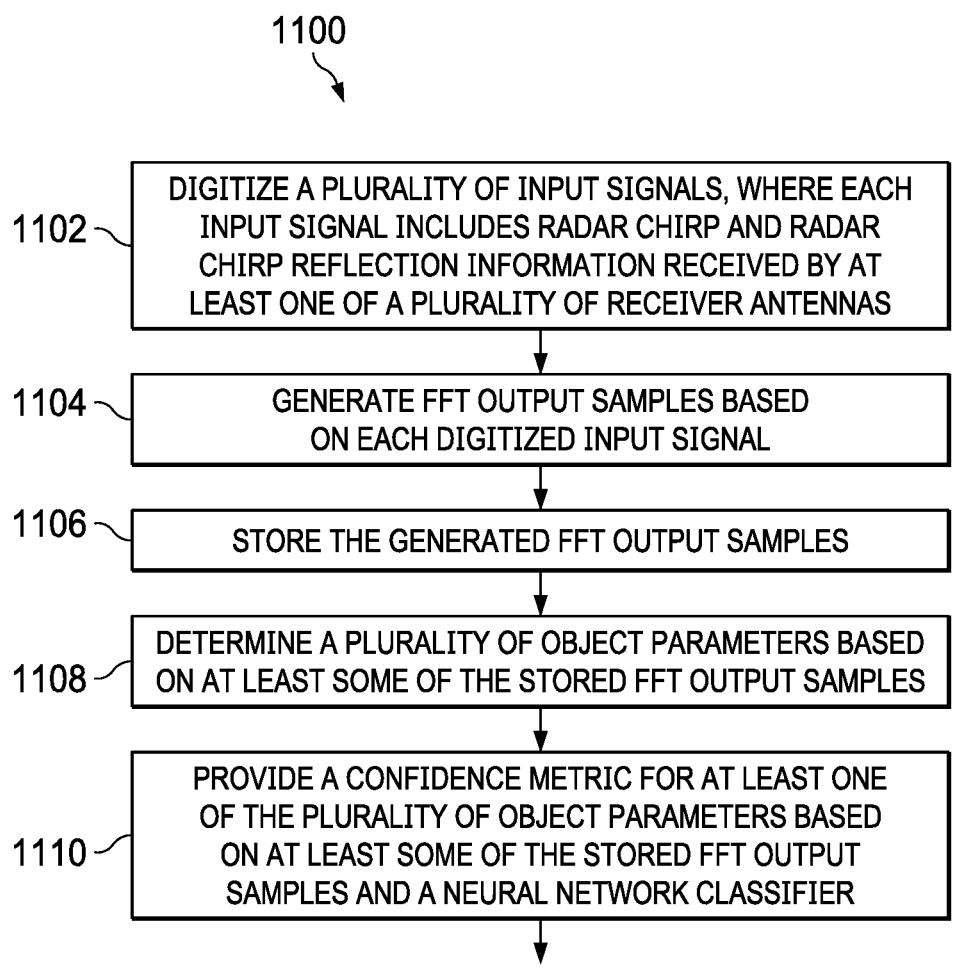
FIG. 11 is a flow chart showing a radar data processing method in accordance with various examples.

FIG. 11 is a flow chart showing a radar data processing method 1100 in accordance with various examples. The method 1100 is performed, for example, by the radar data processing device 1000 of FIG. 10. As shown, the method 1100 comprises digitizing a plurality of input signal, where each input signal includes radar chirp and radar chirp reflection information receiver by at least one of a plurality of receiver antennas at block 1102. At block 1104, FFT output samples are generated based on each digitized input signal. In some examples, at least some of the generated FFT output samples are across antennas FFT output samples associated with at least two of the plurality of receiver antennas. At block 1106, the generated FFT output samples are stored. Example FFT output samples includes FFT output samples for respective receiver antennas (e.g., the set of FFT output samples 602A-602N in FIG. 6), accumulated FFT output samples (e.g., the set of FFT output samples 612 in FIG. 6), and across antenna 2D-FFT output samples (e.g., the set of FFT output samples 631 in FIG. 6). At block 1108, a plurality of object parameters are determined based on at least some of the stored FFT output samples. At block 1110, a confidence metric is provided for at least one of the object parameters based on at least some of the stored FFT output samples and a neural network classifier. In one example, providing the confidence metric at block 1110 comprises using an ANN trained to provide a confidence metric for direction of arrival data obtained using the stored FFT output samples, and wherein the direction of arrival data is a function of azimuth and elevation. In another example, providing the confidence metric at block 1110 comprises only analyzing FFT output samples and providing a confidence metric for an object parameter associated with a previously detected object. In different examples, the method 1100 uses the confidence metric provided at block 1110 for object detection, object tracking (e.g., tracking object position, velocity, and/or angle over time), and/or updating a CFAR detection threshold.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. For example, while the disclosed radar data processing options are described as being related to an FMCW radar system, use of neural network classifiers and confidence metrics with in other radar data processing systems is possible. It is intended that the following claims be interpreted to embrace all such variations and modifications.

What is claimed is:

1. A radar data processing device that comprises:
    at least one analog-to-digital converter (ADC) configured to digitize a plurality of input signals, wherein each input signal includes radar chirp and radar chirp reflection information received at one of a plurality of receiver antennas;
    Fast Fourier Transform (FFT) logic configured to generate FFT output samples based on each digitized input signal, wherein at least some of the generated FFT output samples are across antenna FFT output samples associated with at least two of the plurality of receiver antennas; and
    a processor configured to detect the presence of at least one object in the generated FFT output samples relative to a constant false alarm rate (CFAR) detection threshold and determine a plurality of object parameters for the at least one detected object based on at least some of the generated FFT output samples, wherein the processor uses a neural network classifier trained to provide a confidence metric for at least one of the plurality of object parameters;
    and wherein the processor is further configured to adjust the CFAR detection threshold responsive to the confidence metric for the at least one of the plurality of object parameters.

2. The device of claim 1, wherein the neural network classifier comprises an artificial neural network (ANN) configured to provide a confidence metric for direction of arrival data obtained using at least some of the generated FFT output samples.

3. The device of claim 2, wherein the direction of arrival data is a function of azimuth and elevation.

4. The device of claim 1, wherein the neural network classifier is configured to only analyze FFT output samples and to provide a confidence metric for an object parameter associated with a previously detected object.

5. The device of claim 1, wherein the neural network classifier is configured to analyze FFT output samples and to provide a confidence metric used for object detection.

6. The device of claim 1, wherein the neural network classifier is trained to analyze FFT output samples and to provide a confidence metric used for object tracking.

7. The device of claim 1, wherein the confidence metric is based on at least one of: strength of signals received by the at least two receiver antennas; a pattern of signals received by the at least two receiver antennas; a distribution of FFT output samples as a function of range and Doppler; and a distribution of FFT output samples as a function of elevation and azimuth.

8. The device of claim 1, wherein the processor is configured to adjust the CFAR detection threshold by:
    responsive to the confidence metric for the at least one of the plurality of object parameters exceeding a threshold, decreasing the CFAR detection threshold.

9. The device of claim 1, wherein the processor is configured to adjust the CFAR detection threshold by:
    determining an amount of adjustment of the CFAR detection threshold responsive to the confidence metric of the at least one of the plurality of object parameters.

10. An integrated circuit that comprises:
    Fast Fourier Transform (FFT) logic configured to receive digitized input signals that include radar chirp and radar chirp reflection information received at a plurality of receiver antennas and to generate FFT output samples based on the digitized input signals, wherein at least some of the generated FFT output samples are across antenna FFT output samples associated with at least two of the plurality of receiver antennas; and
    a processor configured to detect the presence of at least one object in the generated FFT output samples relative to a constant false alarm rate (CFAR) detection threshold and determine a plurality of object parameters for the at least one detected object based on at least some of the generated FFT output samples, wherein the processor uses a neural network classifier trained to provide a confidence metric for at least one of the plurality of object parameters;
    and wherein the processor is further configured to adjust a constant false alarm rate (CFAR) detection threshold responsive to the confidence metric for the at least one of the plurality of object parameters.

11. The integrated circuit of claim 10, wherein the neural network classifier comprises an artificial neural network (ANN) configured to provide a confidence metric for direction of arrival data obtained using at least some of the generated FFT output samples.

12. The integrated circuit of claim 11, wherein the direction of arrival data is a function of azimuth and elevation.

13. The integrated circuit of claim 10, wherein the neural network classifier is configured to only analyze FFT output samples and to provide a confidence metric for an object parameter associated with a previously detected object.

14. The integrated circuit of claim 10, wherein the neural network classifier is configured to analyze FFT output samples and to provide a confidence metric used for object detection.

15. The integrated circuit of claim 10, wherein the neural network classifier is configured to analyze FFT output samples and to provide a confidence metric used for object tracking.

16. The integrated circuit of claim 10, wherein the processor is configured to adjust the CFAR detection threshold by:

responsive to the confidence metric for the at least one of the plurality of object parameters exceeding a threshold, decreasing the CFAR detection threshold.

17. The integrated circuit of claim 10, wherein the processor is configured to adjust the CFAR detection threshold by:
   determining an amount of adjustment of the CFAR detection threshold responsive to the confidence metric of the at least one of the plurality of object parameters.

18. A method that comprises:
   digitizing a plurality of input signals, wherein each input signal includes radar chirp and radar chirp reflection information received at one of a plurality of receiver antennas;
   generating FFT output samples based on each digitized input signal, wherein at least some of the generated FFT output samples are across antennas FFT output samples associated with at least two of the plurality of receiver antennas;
   detecting the presence of at least one object in the generated FFT output samples relative to a constant false alarm rate (CFAR) detection threshold;
   storing the generated FFT output samples;
   determining a plurality of object parameters for the at least one detected object based on the stored FFT output samples;
   providing a confidence metric for at least one of the plurality of object parameters based on at least some of the stored FFT output samples and using a neural network classifier; and
   responsive to the confidence metric for the at least one of the plurality of object parameters, adjusting the CFAR detection threshold.

19. The method of claim 18, wherein providing the confidence metric comprises using an artificial neural network (ANN) trained to provide a confidence metric for direction of arrival data obtained using at least some of the stored FFT output samples, and wherein the direction of arrival data is a function of azimuth and elevation.

20. The method of claim 18, wherein providing the confidence metric comprises only analyzing FFT output samples and providing a confidence metric for an object parameter associated with a previously detected object.

21. The method of claim 18, further comprising performing object detection based on the confidence metric.

22. The method of claim 18, further comprising performing object tracking based on the confidence metric.

23. The method of claim 18, wherein the step of adjusting the CFAR detection threshold comprises:
   responsive to the confidence metric for the at least one of the plurality of object parameters exceeding a threshold, decreasing the CFAR detection threshold.

24. The method of claim 18, wherein the step of adjusting the CFAR detection threshold further comprises:
   determining an amount of adjustment of the CFAR detection threshold responsive to the confidence metric of the at least one of the plurality of object parameters.

\* \* \* \* \*